United States Patent
Kodera

(10) Patent No.: US 10,759,472 B2
(45) Date of Patent: Sep. 1, 2020

(54) STEERING CONTROLLER

(71) Applicant: JTEKT CORPORATION, Osaka-shi, Osaka (JP)

(72) Inventor: Takashi Kodera, Okazaki (JP)

(73) Assignee: JTEKT CORPORATION, Osaka-shi (JP)

(*) Notice: Subject to any disclaimer, the term of this patent is extended or adjusted under 35 U.S.C. 154(b) by 9 days.

(21) Appl. No.: 15/701,865

(22) Filed: Sep. 12, 2017

(65) Prior Publication Data
US 2018/0079448 A1    Mar. 22, 2018

(30) Foreign Application Priority Data
Sep. 21, 2016    (JP) .................................. 2016-184259

(51) Int. Cl.
| B62D 6/02 | (2006.01) |
| B62D 5/04 | (2006.01) |
| B62D 6/00 | (2006.01) |

(Continued)

(52) U.S. Cl.
CPC ........... *B62D 5/0478* (2013.01); *B62D 5/001* (2013.01); *B62D 5/006* (2013.01); *B62D 5/043* (2013.01);

(Continued)

(58) Field of Classification Search
None
See application file for complete search history.

(56) References Cited

U.S. PATENT DOCUMENTS

| 7,322,439 B2* | 1/2008 | Hara ...................... B62D 1/163 180/402 |
| 7,962,262 B2* | 6/2011 | Kobayashi ............. B62D 6/002 180/6.2 |
| 10,086,840 B2* | 10/2018 | Cunningham ......... B60W 10/11 |

(Continued)

FOREIGN PATENT DOCUMENTS

| JP | 2008-155723 A | 7/2008 |
| JP | 4725132 B2 | 7/2011 |

(Continued)

OTHER PUBLICATIONS

Machine translation of JP2017024623, provided by https://worldwide.espacenet.com generated on Dec. 12, 2018. (Year: 2015).*

(Continued)

*Primary Examiner* — Adam D Tissot
*Assistant Examiner* — Laura E Linhardt
(74) *Attorney, Agent, or Firm* — Oliff PLC

(57) ABSTRACT

Provided is a steering controller configured to switch from an interruption state to a transmission state. In a state where power transmission from the steering wheel to steered wheels is interrupted, a maximum value selection processing circuit outputs a maximum value, out of a steered angle and a steering angle, to a limiting reaction force setting processing circuit. When the absolute value of the maximum value has become equal to or larger than a limitation start threshold value, the limiting reaction force setting processing circuit rapidly increases a limiting reaction force. An operation signal generation processing circuit controls a reaction-force motor to achieve a reaction force command value corresponding to the limiting reaction force. When the absolute value of the maximum value has become equal to or larger than an engagement threshold value, a clutch is engaged to transmit reaction force from the steered wheel-side to the steering wheel.

7 Claims, 6 Drawing Sheets

(51) Int. Cl.
  *B62D 15/02* (2006.01)
  *B62D 5/00* (2006.01)

(52) U.S. Cl.
  CPC ........... *B62D 5/0469* (2013.01); *B62D 6/008* (2013.01); *B62D 15/021* (2013.01); *B62D 5/0409* (2013.01); *B62D 5/0421* (2013.01); *B62D 5/0442* (2013.01)

(56) References Cited

U.S. PATENT DOCUMENTS

| | | | | |
|---|---|---|---|---|
| 2005/0279562 | A1* | 12/2005 | Hara | B62D 1/163 |
| | | | | 180/402 |
| 2006/0200290 | A1 | 9/2006 | Chino et al. | |
| 2012/0245799 | A1* | 9/2012 | Ono | B62D 5/008 |
| | | | | 701/42 |
| 2016/0221601 | A1* | 8/2016 | Barthomeuf | B62D 5/0469 |

FOREIGN PATENT DOCUMENTS

| | | | | |
|---|---|---|---|---|
| JP | 2014-133521 A | | 7/2014 | |
| JP | 2014133521 | * | 7/2014 | ............... B26D 5/04 |
| JP | 2017024623 | * | 7/2015 | ............. B62D 5/001 |
| WO | 2014/038133 A1 | | 3/2014 | |
| WO | 2014/054253 A1 | | 4/2014 | |

OTHER PUBLICATIONS

Machine translation of JP2014133521 (included in the IDS), provided by https://worldwide.espacenet.com generated on Dec. 13, 2018. (Year: 2014).*

Feb. 22, 2018 Extended European Search Report in European Patent Application No. 17191127.4.

Jun. 2, 2020 Office Action issued in Japanese Patent Application No. 2016-184259.

* cited by examiner

STEERING CONTROLLER

INCORPORATION BY REFERENCE

The disclosure of Japanese Patent Application No. 2016-184259 filed on Sep. 21, 2016 including the specification, drawings and abstract, is incorporated herein by reference in its entirety.

BACKGROUND OF THE INVENTION

1. Field of the Invention

The invention relates to a steering controller configured to control a steering system including: a switching device configured to perform switching between a transmission state where power transmission from a steering wheel to steered wheels is allowed and an interruption state where power transmission from the steering wheel to the steered wheels is interrupted; a reaction-force actuator configured to apply a steering reaction force to the steering wheel in the interruption state; and a steered operation actuator configured to steer the steered wheels.

2. Description of the Related Art

For example, Japanese Patent No. 4725132 describes a controller for a steer-by-wire system in which a reaction force is applied by a reaction-force actuator to a steering wheel while a backup clutch (switching device) is disengaged and thus power transmission between the steering wheel and steered wheels is interrupted. When the steered angle of the steered wheels has nearly reached a limit angle, the controller outputs a command to engage the backup clutch and executes a process of progressively increasing the reaction force to be applied by the reaction-force actuator to the steering wheel with the lapse of time until the backup clutch enters an engaged state (power transmission state).

However, engaging the backup clutch in this way may reduce the driving feel. For example, a user may sense, via the steering wheel, that the backup clutch is engaged.

SUMMARY OF THE INVENTION

One object of the invention is to provide a steering controller configured to reduce, as much as possible, the occurrence of switching of a switching device from an interruption state to a transmission state when executing a process for suppressing a steering wheel from being operated such that a steering angle exceeds an upper limit value.

An aspect of the invention relates to a steering controller configured to control a steering system including a switching device configured to perform switching between a transmission state where power transmission from a steering wheel to steered wheels is allowed and an interruption state where power transmission from the steering wheel to the steered wheels is interrupted, a reaction-force actuator configured to apply a steering reaction force to the steering wheel in the interruption state, and a steered operation actuator configured to steer the steered wheels. The steering controller includes: a memory configured to store control software; and a hardware device configured to execute the control software. When an absolute value of a steering angle achieved by an operation of the steering wheel has reached a first threshold value in the interruption state, the steering controller executes a limitation process of operating the reaction-force actuator so as to apply, to the steering wheel, a limiting reaction force that is a reaction force for suppressing the absolute value of the steering angle from further increasing. When the absolute value of the steering angle has become equal to or larger than a second threshold value that is larger than the first threshold value, the steering controller executes a transmission process of operating the switching device so as to execute switching from the interruption state to the transmission state.

According to the above aspect, when the steering angle has reached the first threshold value, the limiting reaction force is applied to the steering wheel to suppress the absolute value of the steering angle from further increasing. This allows a user to sense that the steering angle is near a maximum value, and thus prevents the user from operating the steering wheel so as to further increase the steering angle. If, nevertheless, the user further increases the steering angle and the steering angle has become equal to or larger than the second threshold value, the switching device is switched to the transmission state in order to apply a reaction force from the steered wheel-side to the steering wheel and thereby suppressing further increase in the steering angle. Thus, it is possible to reduce, as much as possible, the occurrence of switching of the switching device from the interruption state to the transmission state when executing a process for suppressing the steering wheel from being operated such that the steering angle exceeds the upper limit value.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
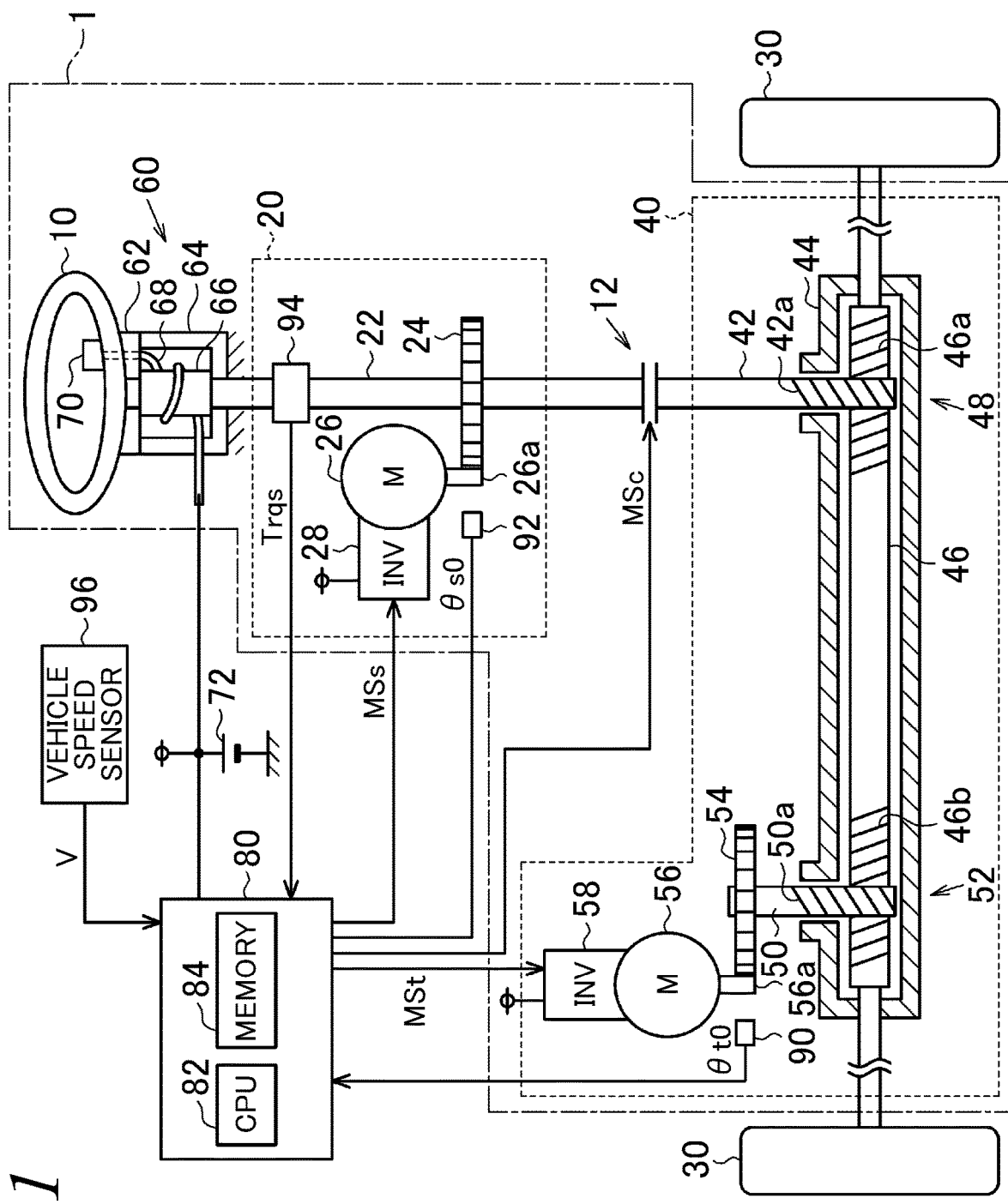
FIG. 1 is a view illustrating a steering controller according to a first embodiment and an object to be controlled by the steering controller.

Hereinafter, a steering controller according to a first embodiment of the invention will be described with reference to the accompanying drawings. As illustrated in FIG. 1, in a steering system 1 according to the present embodiment, a steering wheel 10 is connected to a reaction-force actuator 20 configured to apply a reaction force that is a force acting against an operation of the steering wheel 10. The reaction-force actuator 20 includes a steering shaft 22 fixed to the steering wheel 10, a reaction-force-side speed reducer 24, a reaction-force motor 26 provided with a rotary shaft 26a coupled to the reaction-force-side speed reducer 24, and an inverter 28 configured to drive the reaction-force motor 26.

In this case, the reaction-force motor 26 is a surface permanent magnet synchronous motor (SPMSM).

The steering shaft 22 can be coupled via a clutch 12 to a pinion shaft 42 of a steered operation actuator 40. In the present embodiment, the clutch 12 is a normally-closed clutch that transmits power while no current is applied to the clutch 12.

The steered operation actuator 40 is a dual-pinion steered operation actuator including a first rack-and-pinion mechanism 48 and a second rack-and-pinion mechanism 52, and further includes a steered-side motor 56 (SPMSM) and an inverter 58. The first rack-and-pinion mechanism 48 includes a rack shaft 46 and the pinion shaft 42 that are disposed at a prescribed intersection angle, and first rack teeth 46a provided on the rack shaft 46 and pinion teeth 42a provided on the pinion shaft 42 are meshed with each other. Steered wheels 30 are coupled to respective ends of the rack shaft 46 via tie-rods.

The second rack-and-pinion mechanism 52 includes the rack shaft 46 and a pinion shaft 50 disposed at a prescribed intersection angle, and second rack teeth 46b provided on the rack shaft 46 and pinion teeth 50a provided on the pinion shaft 50 are meshed with each other.

The pinion shaft 50 is connected via a steered-side speed reducer 54 to a rotary shaft 56a of the steered-side motor 56. The inverter 58 is connected to the steered-side motor 56. The rack shaft 46 is housed in a rack housing 44.

A spiral cable device 60 is coupled to the steering wheel 10. The spiral cable device 60 includes a first housing 62 fixed to the steering wheel 10, a second housing 64 fixed to a vehicle body, a tubular member 66 that is housed in a space defined by the first housing 62 and the second housing 64 and that is fixed to the second housing 64, and a spiral cable 68 wound around the tubular member 66. The steering shaft 22 is inserted in the tubular member 66. The spiral cable 68 is an electric wire that connects a horn 70 fixed to the steering wheel 10 and, for example, a battery 72 fixed to the vehicle body to each other.

A controller 80 executes control for steering the steered wheels 30 in response to an operation of the steering wheel 10, by operating the steering system 1 including the reaction-force actuator 20 and the steered operation actuator 40. Specifically, in the present embodiment, a steer-by-wire system is achieved by the reaction-force actuator 20 and the steered operation actuator 40, and the controller 80 usually executes the control for steering the steered wheels 30 in response to an operation of the steering wheel 10 while keeping the clutch 12 in an interruption state. For this purpose, the controller 80 acquires a rotation angle θs0 of the rotary shaft 26a of the reaction-force motor 26, which is detected by a steering-side sensor 92, and a steering torque Trqs applied to the steering shaft 22, which is detected by a torque sensor 94. Moreover, the controller 80 acquires a rotation angle θt0 of the rotary shaft 56a of the steered-side motor 56, which is detected by a steered-side sensor 90, and a vehicle speed V detected by a vehicle speed sensor 96.

Specifically, the controller 80 includes a central processing unit (CPU) 82 and a memory 84, and the steered operation actuator 40 and the reaction-force actuator 20 are operated as the CPU 82 executes a program stored in the memory 84.

Figure 2:
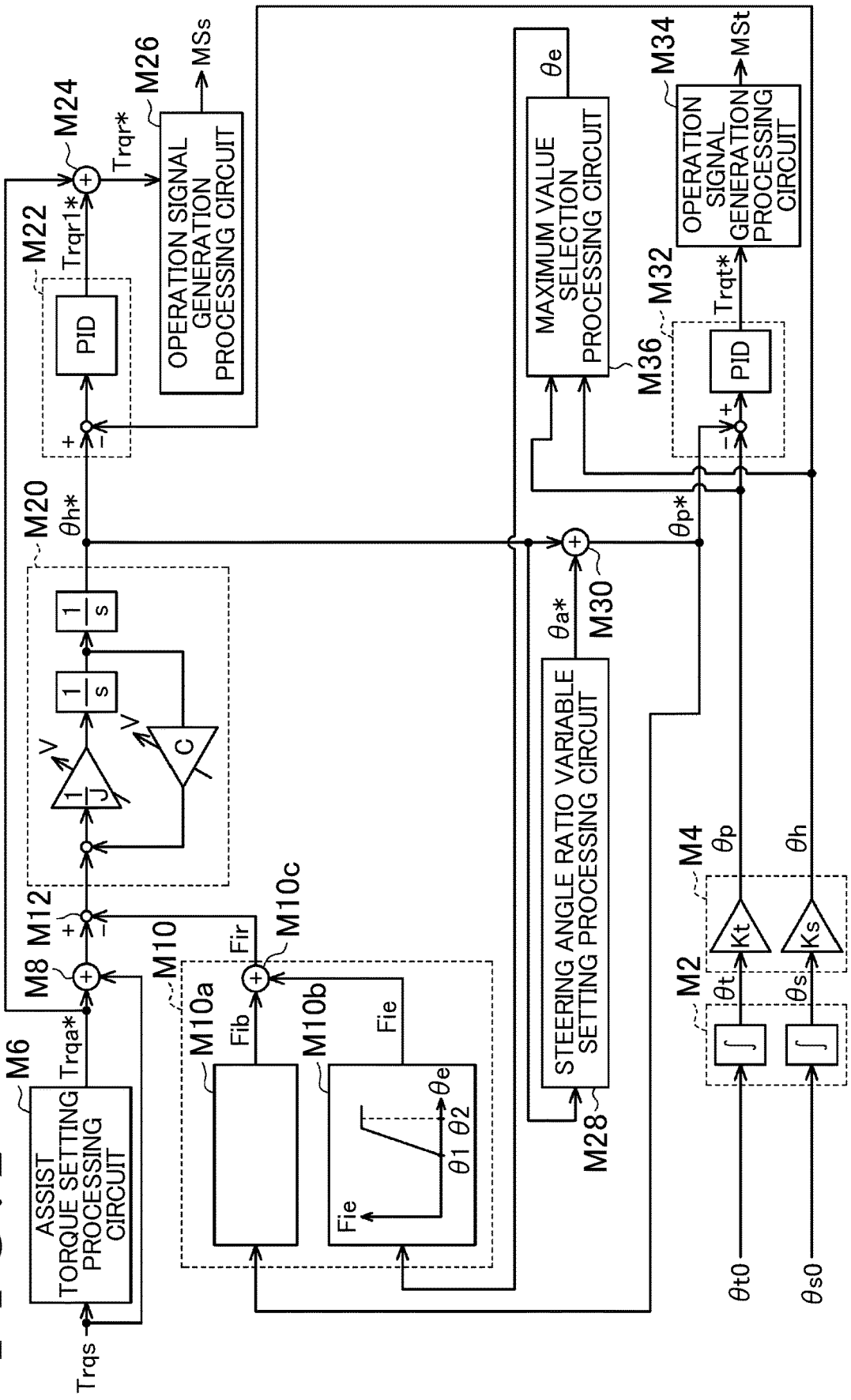
FIG. 2 is a block diagram according to the first embodiment.

FIG. 2 illustrates some of the processes executed by the controller 80. FIG. 2 illustrates some of the processes that are executed when the CPU 82 executes programs stored in the memory 84, based on the kind of process to be executed.

An integration processing circuit M2 converts the rotation angle θs0 detected by the steering-side sensor 92 and the rotation angle θt0 detected by the steered-side sensor 90 into numerical values within an angular range wider than a range of 0° to 360°, thereby obtaining rotation angles θs, θt. Specifically, for example, when the steering wheel 10 is turned maximally to the right or to the left from a neutral position at which the vehicle travels straight forward, the rotary shaft 26a rotates beyond 360°. Therefore, for example, when the rotary shaft 26a rotates twice in a prescribed direction from the state where the steering wheel 10 is at the neutral position, the integration processing circuit M2 sets an output value to 720°. The integration processing circuit M2 sets an output value to zero when the steering wheel 10 is at the neutral position.

A measurement unit setting processing circuit M4 multiplies the output value from the steering-side sensor 92, which has been subjected to the process by the integration processing circuit M2, by a conversion factor Ks, thereby calculating a steering angle θh, and multiplies the output value from the steered-side sensor 90, which has been subjected to the process by the integration processing circuit M2, by a conversion factor Kt, thereby calculating a steered angle θp. In this case, the conversion factor Ks is set based on a ratio of rotation speed between the reaction-force-side speed reducer 24 and the rotary shaft 26a of the reaction-force motor 26, and the conversion factor Ks is used to convert an amount of change in the rotation angle θs of the rotary shaft 26a into an amount of turning of the steering wheel 10. Thus, the steering angle θh represents a turning angle of the steering wheel 10 with respect to the neutral position. The conversion factor Kt is a product of a ratio of rotation speed between the steered-side speed reducer 54 and the rotary shaft 56a of the steered-side motor 56 and a ratio of rotation speed between the pinion shaft 50 and the pinion shaft 42. This conversion factor Kt is used to convert an amount of rotation of the rotary shaft 56a into an amount of turning of the steering wheel 10 on the assumption that the clutch 12 is engaged.

In the processes illustrated in FIG. 2, the rotation angles θs, θt, the steering angle θh, and the steered angle θp each take a positive value when the rotation direction is a prescribed direction, whereas the rotation angles θs, θt, the steering angle θh, and the steered angle θp each take a negative value when the rotation direction is a direction opposite to the prescribed direction. Thus, for example, when the rotary shaft 26a rotates in a direction opposite to the prescribed direction from the state where the steering wheel 10 is at the neutral position, the integration processing circuit M2 outputs a negative output value. However, this is merely an example of control system logics. In particular, in this specification, that the rotation angles θs, θt, the steering angle θh, and the steered angle θp are large means that the amount of change from the neutral position is large. In other words, this means that the absolute value of a parameter that takes a positive value or a negative value as described above is large.

An assist torque setting processing circuit M6 sets an assist torque Trqa* based on the steering torque Trqs. The assist torque Trqa* is set to a larger value as the steering torque Trqs is larger. An addition processing circuit M8 adds the steering torque Trqs to the assist torque Trqa* and outputs a resultant value.

A reaction force setting processing circuit M10 sets a reaction force Fir that is a force acting against turning of the steering wheel 10. Specifically, in the reaction force setting processing circuit M10, a base reaction force setting processing circuit M10a sets a base reaction force Fib in response to an operation of the steering wheel 10, whereas a limiting reaction force setting processing circuit M10b sets a limiting reaction force Fie that is a reaction force acting against an operation of the steering wheel 10 performed such that the steering angle further approaches an upper limit value when the amount of turning of the steering wheel 10 has approached an allowable maximum value. Then, in the reaction force setting processing circuit M10, the base reaction force Fib and the limiting reaction force Fie are added together by an addition processing circuit M10c. Then, a resultant value is output, as the reaction force Fir, from the reaction force setting processing circuit M10.

A deviation calculation processing circuit M12 outputs a value obtained by subtracting the reaction force Fir from the value output from the addition processing circuit M8. A steering angle command value calculation processing circuit M20 sets a steering angle command value $\theta h^*$ based on the value output from the deviation calculation processing circuit M12. The steering angle command value calculation processing circuit M20 uses a model equation expressed by Equation (c1) that correlates an output value from the deviation calculation processing circuit M12 with the steering angle command value $\theta h^*$.

$$\Delta = C \cdot \theta h^{*\prime} + J \cdot \theta h^{*\prime\prime}$$ Equation (c1)

The model expressed by Equation (c1) is a model that defines a relationship between an axial force and a rotation angle of the rack shaft 46 in a system in which the steering wheel 10 and the steered wheels 30 are mechanically coupled to each other. In the Equation (c1), a viscosity coefficient C is obtained by modeling, for example, friction in the steering system, and an inertia coefficient J is obtained by modeling inertia in the steering system. In this case, the viscosity coefficient C and the inertia coefficient J are variably set based on the vehicle speed V.

A steering angle feedback processing circuit M22 sets a feedback torque Trqr1* as a manipulated variable that is used to cause the steering angle $\theta h$ to follow the steering angle command value $\theta h^*$ through feedback control. Specifically, the sum of output values from a proportional element, an integrating element, and a differentiating element based on an input of a value obtained by subtracting the steering angle $\theta h$ from the steering angle command value $\theta h^*$ is used as the feedback torque Trqr1*.

An addition processing circuit M24 outputs the sum of the feedback torque Trqr1* output from the steering angle feedback processing circuit M22 and the assist torque Trqa* output from the assist torque setting processing circuit M6, as a torque command value (reaction force command value Trqr*) for the reaction-force motor 26.

An operation signal generation processing circuit M26 generates an operation signal MSs for the inverter 28 based on the reaction force command value Trqr*, and outputs the operation signal MSs to the inverter 28. This process can be achieved, for example, through known current feedback control in which a q-axis current command value is set based on the reaction force command value Trqr* and a dq-axis voltage command value is set as a manipulated variable used to cause a dq-axis current to follow a command value through feedback control. The d-axis current may be controlled to be zero. However, when the rotation speed of the reaction-force motor 26 is high, field-weakening control may be executed with the absolute value of the d-axis current set to a value larger than zero. However, the absolute value of the d-axis current may be to a value larger than zero in a low rotation speed range.

Based on the steering angle command value $\theta h^*$, a steering angle ratio variable setting processing circuit M28 sets a target operation angle $\theta a^*$ that is used to variably set a steering angle ratio that is a ratio between the steering angle $\theta h$ and the steered angle $\theta p$. An addition processing circuit M30 calculates a steered angle command value $\theta p^*$ by adding the target operation angle $\theta a^*$ to the steering angle command value $\theta h^*$.

A steered angle feedback processing circuit M32 sets a steered operation torque command value Trqt* for a torque generated by the steered-side motor 56, as a manipulated variable used to cause the steered angle $\theta p$ to follow the steered angle command value $\theta p^*$ through feedback control. Specifically, the sum of output values from a proportional element, an integrating element, and a differentiating element based on an input of a value obtained by subtracting the steered angle $\theta p$ from the steered angle command value $\theta p^*$ is used as the steered operation torque command value Trqt*.

An operation signal generation processing circuit M34 generates an operation signal MSt for the inverter 58 based on the steered operation torque command value Trqt*, and outputs the operation signal MSt to the inverter 58. This process can be executed in a manner similar to the manner in which the operation signal generation process is executed by the operation signal generation processing circuit M26.

A maximum value selection processing circuit M36 selects a larger value (maximum value $\theta e$), in terms of the absolute value, out of the steering angle $\theta h$ and the steered angle $\theta p$, and outputs the maximum value $\theta e$. The base reaction force setting processing circuit M10a receives the steered angle command value $\theta p^*$ as an input. On the other hand, the limiting reaction force setting processing circuit M10b receives the maximum value $\theta e$ as an input, and sets the limiting reaction force Fie based on the maximum value $\theta e$. This setting is executed in order to execute control for increasing the force acting against further increase in the absolute value of the steering angle of the steering wheel 10, immediately before an end of the rack shaft 46 comes into contact with the rack housing 44 due to an axial displacement of the rack shaft 46, and immediately before the steering angle of the steering wheel 10 reaches the upper limit value defined based on the length of the spiral cable 68. This setting will be described in detail below.

Figure 3:
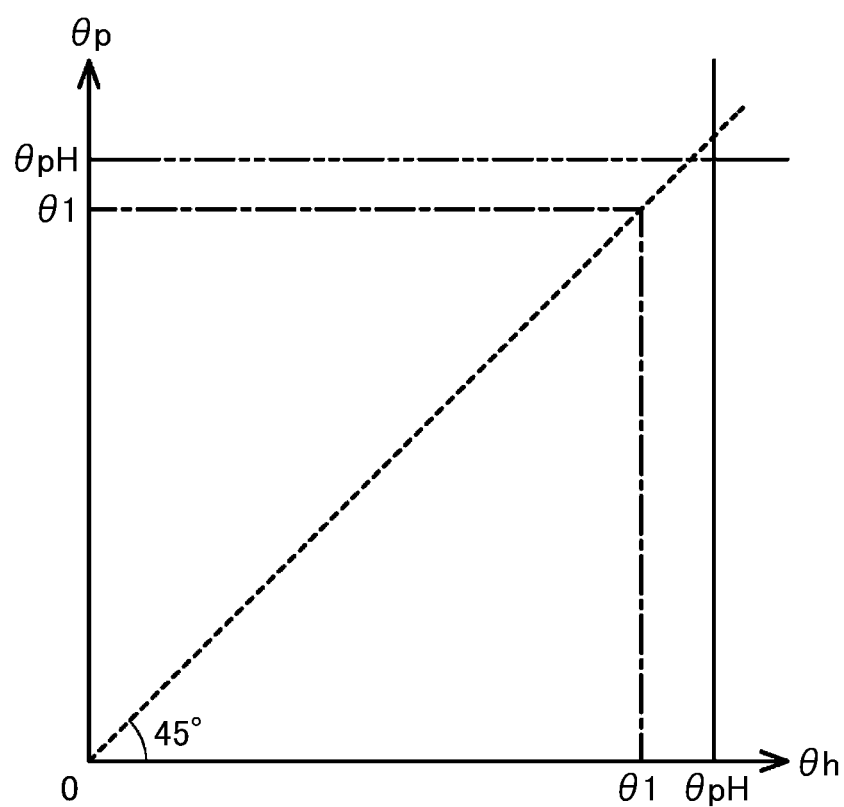
FIG. 3 is a graph illustrating a steering angle threshold value and a steered angle threshold value according to the first embodiment.

FIG. 3 illustrates the relationship between an upper limit value $\theta hH$ of the steering angle $\theta h$ and an upper limit value $\theta pH$ of the steered angle $\theta p$. As illustrated in FIG. 3, in the present embodiment, the upper limit value $\theta hH$ of the steering angle $\theta h$ and the upper limit value $\theta pH$ of the steered angle $\theta p$ are almost equal to each other. This relationship is achieved through setting of the measurement units of the steering angle $\theta h$ and the steered angle $\theta p$, which is executed by the measurement unit setting processing circuit M4. Specifically, in the present embodiment, the length of the spiral cable 68 includes a small margin, so that the steering wheel 10 can be further turned slightly when the rack shaft 46 has been displaced in the axial direction to be brought into contact with the rack housing 44 while the clutch 12 is engaged. Therefore, the measurement unit setting processing circuit M4 sets the steering angle $\theta h$ to the turning angle of the steering wheel 10, and sets the steered angle $\theta p$ to the turning angle of the steering wheel 10 on the assumption that the target operation angle $\theta a^*$ is zero, so that the upper limit value $\theta hH$ of the steering angle $\theta h$ and the upper limit value $\theta pH$ of the steered angle $\theta p$ are almost equal to each other.

In the present embodiment, therefore, a limitation start threshold value $\theta 1$ is set for each of the steering angle $\theta h$ and the steered angle $\theta p$, and the reaction force applied to the steering wheel 10 is controlled to be increased before the absolute value of the steering angle θh reaches the upper limit value θhH and before the absolute value of the steered angle θp reaches the upper limit value θpH. The limiting reaction force setting processing circuit M10b illustrated in FIG. 2 has a map that defines the relationship between the absolute value of the maximum value θe and the limiting reaction force Fie. In this map, the limiting reaction force Fie becomes larger than zero when the absolute value of the maximum value θe becomes equal to or larger than the limitation start threshold value θ1. In particular, the limiting reaction force Fie is set to a value that is large enough to allow the user to sense that it is difficult to operate the steering wheel 10 so as to further increase the absolute value of the steering angle θh, when the absolute value of the maximum value θe has increased to some extent beyond the limitation start threshold value θ1. FIG. 2 illustrates only a case where the limiting reaction force Fie increases as the maximum value θe increases from zero in the prescribed rotation direction. Further, the absolute value of the limiting reaction force Fie increases when the maximum value θe increases in a direction opposite to the prescribed rotation direction. Note that, the limiting reaction force Fie in the process illustrated in FIG. 2 takes a negative value when the rotation direction is a direction opposite to the prescribed rotation direction.

In the present embodiment, the controller 80 executes a process of engaging the clutch 12 under prescribed conditions while the limiting reaction force Fie is applied to the steering wheel 10. The process will be described below.

Figure 4:
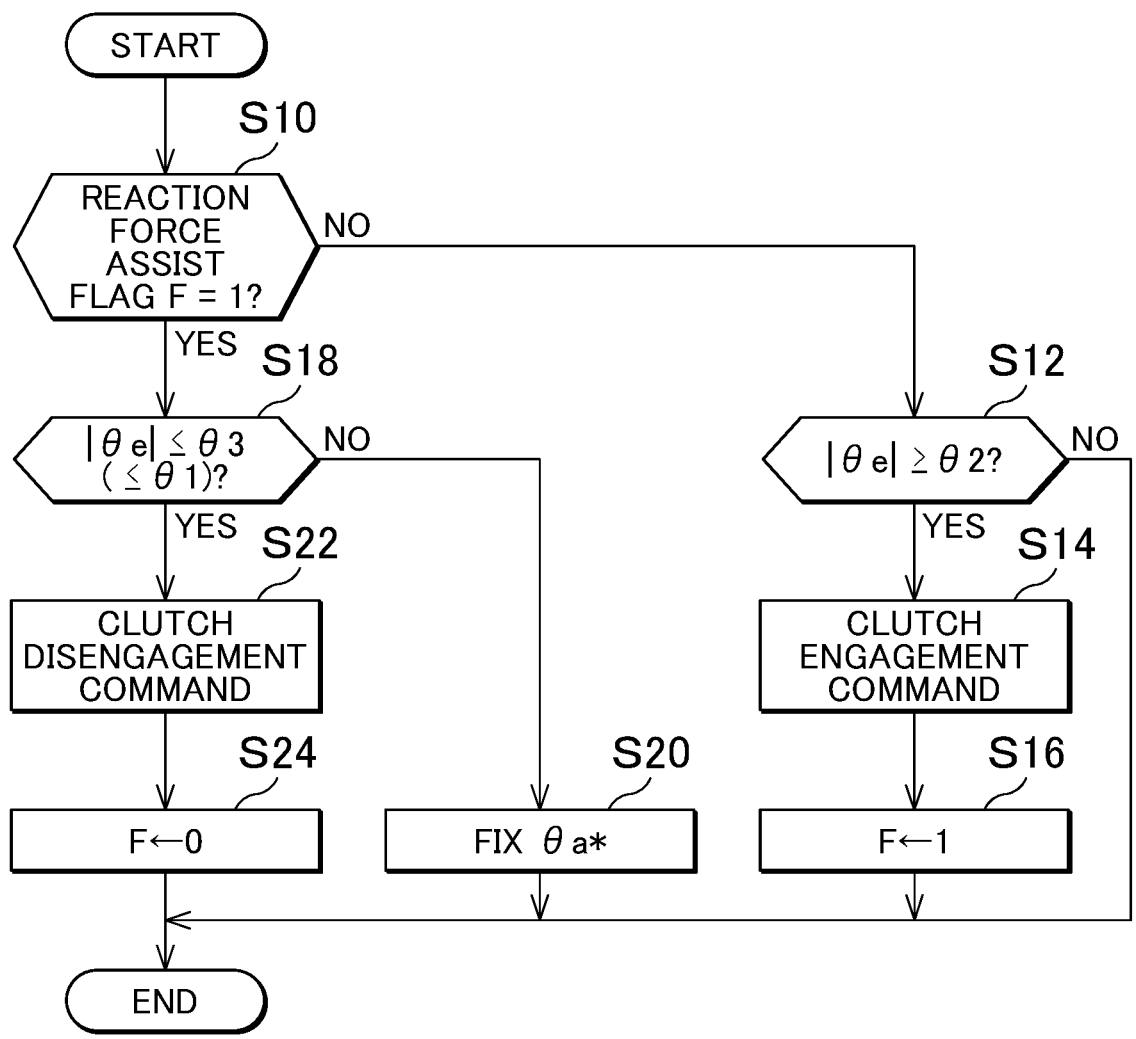
FIG. 4 is a flowchart illustrating the procedures of a process of engaging and disengaging a clutch according to the first embodiment.

FIG. 4 illustrates the procedures of a process of engaging and disengaging the clutch 12. The process illustrated in FIG. 4 is achieved when the CPU 82 executes a program stored in the memory 84 repeatedly at prescribed time intervals. The following process is executed when the clutch 12 is not engaged due to, for example, a malfunction of the steering system 1. In other words, the process illustrated in FIG. 4 is executed on the precondition that the clutch 12 has been disengaged before the clutch 12 is engaged in this process. Hereinafter, step numbers will be represented by numbers following the first letter "S."

In the procedures of the process illustrated in FIG. 4, the CPU 82 first determines whether a reaction force assist flag F is one (1) (S10). The fact that the reaction force assist flag F is 1 indicates that a logical conjunction of the following logical propositions i), ii) is true: i) the clutch 12 is switched to an engaged state while a reaction force corresponding to the limiting reaction force Fie is applied to the steering wheel 10; and ii) the clutch 12 has not been disengaged after the engagement of the clutch 12. On the other hand, the fact that the reaction force assist flag F is zero indicates that the logical conjunction is false. When the CPU 82 determines that the reaction force assist flag F is zero (S10: NO), the CPU 82 then determines whether the absolute value of the maximum value θe is equal to or larger than an engagement threshold value θ2 that is larger than the limitation start threshold value θ1 (S12). This process is a process of determining whether to switch the clutch 12 to the engaged state while the limiting reaction force Fie is applied to the steering wheel 10. When the CPU 82 determines that the maximum value θe is equal to or larger than the engagement threshold value θ2 (S12: YES), the CPU 82 then executes a transmission process of engaging the clutch 12 (S14). Specifically, because the clutch 12 is a normally-closed clutch, the CPU 82 stops an operation of applying current to the clutch 12. Then, the CPU 82 sets the reaction force assist flag F to 1 (S16).

On the other hand, when the CPU 82 determines that the reaction force assist flag F is 1 (S10: YES), the CPU 82 then determines whether the absolute value of the maximum value θe is equal to or smaller than a disengagement threshold value θ3 that is equal to or smaller than the limitation start threshold value θ1 (S18). This process is a process of determining whether to switch the clutch 12 from the engaged state to a disengaged state. When the CPU 82 determines that the maximum value θe is larger than the disengagement threshold value θ3 (S18: NO), the CPU 82 sets the target operation angle θa* to a fixed value in view of the fact that the clutch 12 is in the engaged state (S20). This process is a process of stopping the steering angle ratio variable setting process executed by the steering angle ratio variable setting processing circuit M28. Specifically, in this process, for example, a value that is obtained by subtracting the steering angle θh at a timing when the clutch 12 is switched from the disengaged state to the engaged state from the steered angle θp at the same timing is assigned to the target operation angle θa*.

On the other hand, when the CPU 82 determines that the maximum value θe is equal to or smaller than the disengagement threshold value θ3 (S18: YES), the CPU 82 then switches the clutch 12 to the disengaged state (S22). Then, the CPU 82 sets the reaction force assist flag F to zero (S24).

When the process in S16, S20, or S24 is completed or when a negative determination is made in S12, the CPU 82 ends the procedures of the process illustrated in FIG. 4.

The operation of the present embodiment will be described below. When the maximum value θe has become equal to or larger than the limitation start threshold value θ1, the CPU 82 causes the reaction-force actuator 20 to apply a reaction force corresponding to the limiting reaction force Fie to the steering wheel 10. As a result, the force acting against an operation of the steering wheel 10 increases rapidly. This allows the user to sense that the steering angle has approached the limit value.

If the steering wheel 10 is operated so as to further increase the steering angle despite application of the limiting reaction force Fie to the steering wheel 10, the steering torque Trqs exceeds the torque applied to the steering wheel 10 due to the limiting reaction force Fie. In this case, the CPU 82 engages the clutch 12. As a result, a reaction force corresponding to the rack axial force is applied to the steering wheel 10. Although the rack axial force depends on the setting of the suspension geometry, the rack axial force is usually larger when the absolute value of the steered angle θp is large than when the absolute value of the steered angle θp is small. Therefore, even in a case where the steering torque Trqs exceeds a torque that can be generated by the reaction-force actuator 20, when the clutch 12 is engaged to allow the rack axial force to be transmitted to the steering wheel 10, it is difficult to further operate the steering wheel 10 so as to increase the steering angle, depending on the steering torque Trqs. Moreover, when the rack shaft 46 comes into contact with the rack housing 44, the rack shaft 46 cannot be displaced any more. Therefore, a situation where the steering wheel 10 is further largely turned can be avoided, and turning of the steering wheel 10 can be stopped.

Moreover, in the present embodiment, when the absolute value of the steering angle θh has become large, the limiting reaction force Fie is applied to the steering wheel 10 before the clutch 12 is engaged. Thus, as the user senses that the limiting reaction force Fie is applied to the steering wheel 10, the user is likely to be restrained from operating the steering wheel 10 so as to further increase the steering angle by applying an excessively large steering torque Trqs to the steering wheel 10. Thus, the occurrence of a situation where the clutch 12 is engaged can be reduced. The limiting reaction force Fie is generated by the reaction-force actuator 20 under control, so that application of the limiting reaction force Fie is less likely to make an operation of the steering wheel 10 uncomfortable. In contrast to this, engagement of the clutch 12 is likely to make an operation of the steering wheel 10 uncomfortable, due to impact upon engagement of the clutch 12 or mechanical changes occurring in the steering system 1 before and after the clutch 12 is engaged.

The foregoing embodiment produces the following advantageous effects.

(1) The steering wheel 10 is provided with the spiral cable device 60 that turns together with the steering wheel 10 in an integrated manner. In this case, the reliability of the spiral cable 68 may decrease, if the clutch 12 is not engaged when the user applies a large torque to the steering wheel 10 so as to increase the absolute value of the steering angle θh although the maximum value θe has become equal to or larger than the limitation start threshold value θ1 and the limiting reaction force Fie is applied to the steering wheel 10. In other words, the reliability of the spiral cable 68 may decrease, because a force that attempts to stretch the spiral cable 68 is applied thereto even after the spiral cable 68 has reached its maximum length. For this reason, the process of engaging the clutch 12 is especially useful.

(2) The clutch 12 is disengaged when the maximum value θe has become equal to or smaller than the disengagement threshold value θ3 while the clutch 12 is engaged. Further, the disengagement threshold value θ3 is set to be equal to or smaller than the limitation start threshold value θ1. Thus, it is possible to reduce the occurrence of a hunting phenomenon in which a process of engaging the clutch 12 and a process of disengaging the clutch 12 are repeated.

Next, a second embodiment will be described with reference to the drawings. The differences from the first embodiment will be mainly described below.

Figure 5:
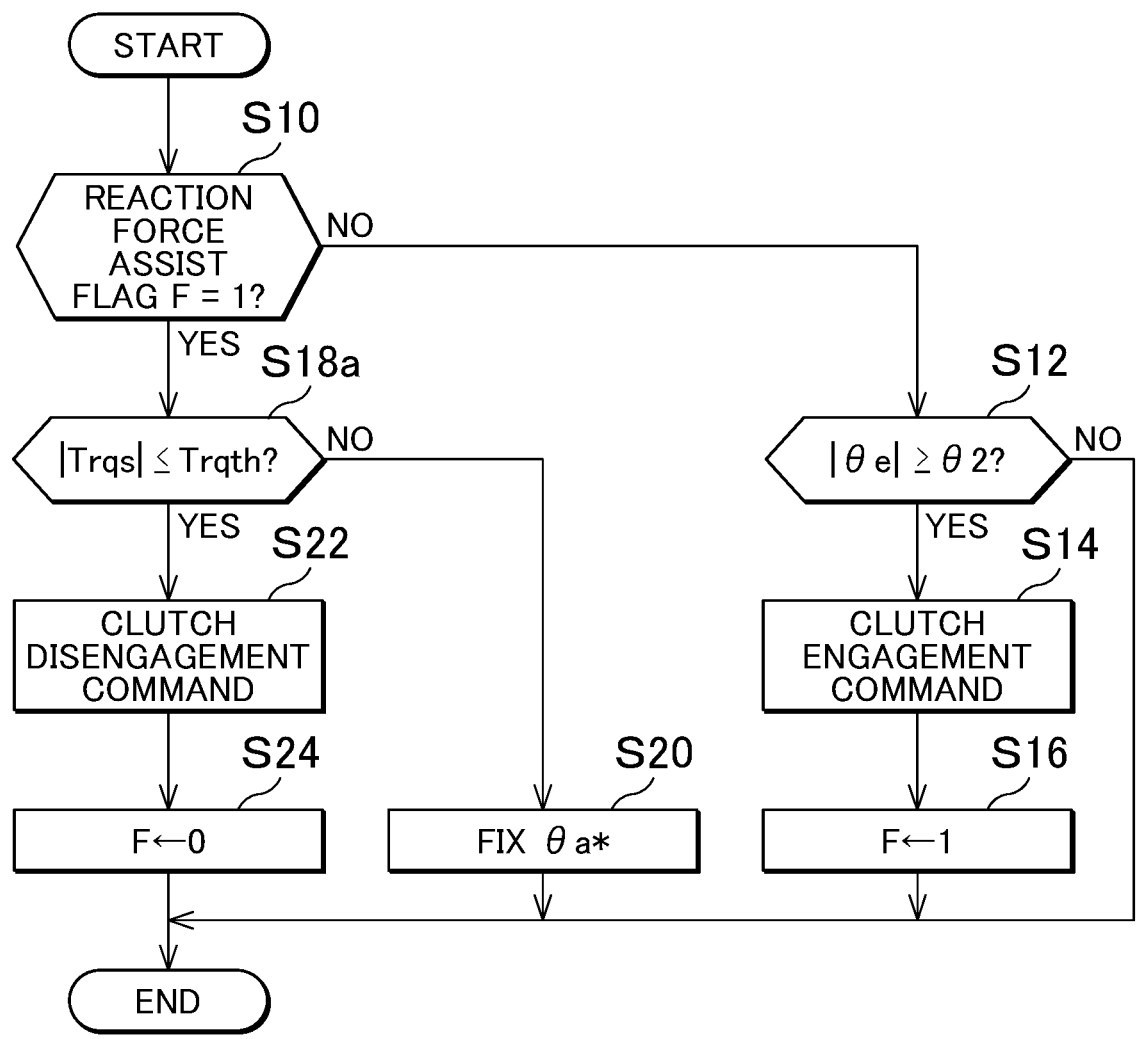
FIG. 5 is a flowchart illustrating the procedures of a process of engaging and disengaging the clutch according to a second embodiment.

FIG. 5 illustrates the procedures of a process of engaging and disengaging the clutch 12 according to the present embodiment. The process illustrated in FIG. 5 is achieved when the CPU 82 executes a program stored in the memory 84 repeatedly at prescribed time intervals. The process illustrated in FIG. 5 substitutes for the process illustrated in FIG. 4. For the sake of convenience, the same steps as those in FIG. 4 will be denoted by the same step numbers and the detailed description thereof will be omitted.

In the procedures of the process illustrated in FIG. 5, when the CPU 82 determines that the reaction force assist flag F is one (1) (S10), the CPU 82 then determines whether the absolute value of the steering torque Trqs is equal to or smaller than a torque threshold value Trqth (S18a). This process is a process of determining whether to disengage the clutch 12. In this case, the torque threshold value Trqth is set to a value smaller than a lower limit value of torque required to further increase the absolute value of the steering angle θh in a range where the maximum value θe is equal to or larger than the limitation start threshold value θ1. In other words, the torque threshold value Trqth is set to a value smaller than the lower limit value of torque at which the absolute value of the steering angle θh can be further increased despite execution of the process of applying the limiting reaction force Fie to the steering wheel 10.

When the CPU 82 determines that the absolute value of the steering torque Trqs is equal to or smaller than the torque threshold value Trqth (S18a: YES), the CPU 82 disengages the clutch 12 (S22). On the other hand, when the CPU 82 determines that the absolute value of the steering torque Trqs is larger than the torque threshold value Trqth (S18a: NO), the CPU 82 proceeds to S20.

Next, a third embodiment will be described with reference to the drawings. The differences from the first embodiment will be mainly described below.

In the first embodiment, the rack shaft 46 is considered to come into contact with the rack housing 44 before the spiral cable 68 is fully stretched, when the absolute value of the difference between the steered angle θp and the upper limit value θpH is smaller than the absolute value of the difference between the steering angle θh and the upper limit value θhH at the steering angle ratio at the time when the maximum value θe reaches the engagement threshold value θ2. In that case, the absolute value of the steering angle θh is limited when the rack shaft 46 comes into contact with the rack housing 44, so that a situation where such a large force as to reduce the reliability of the spiral cable 68 is applied to the spiral cable 68 is avoided. Nevertheless, if the limiting reaction force Fie keeps being applied to the steering wheel 10, the amount of heat generated by the reaction-force motor 26 may become unnecessarily large.

Figure 6:
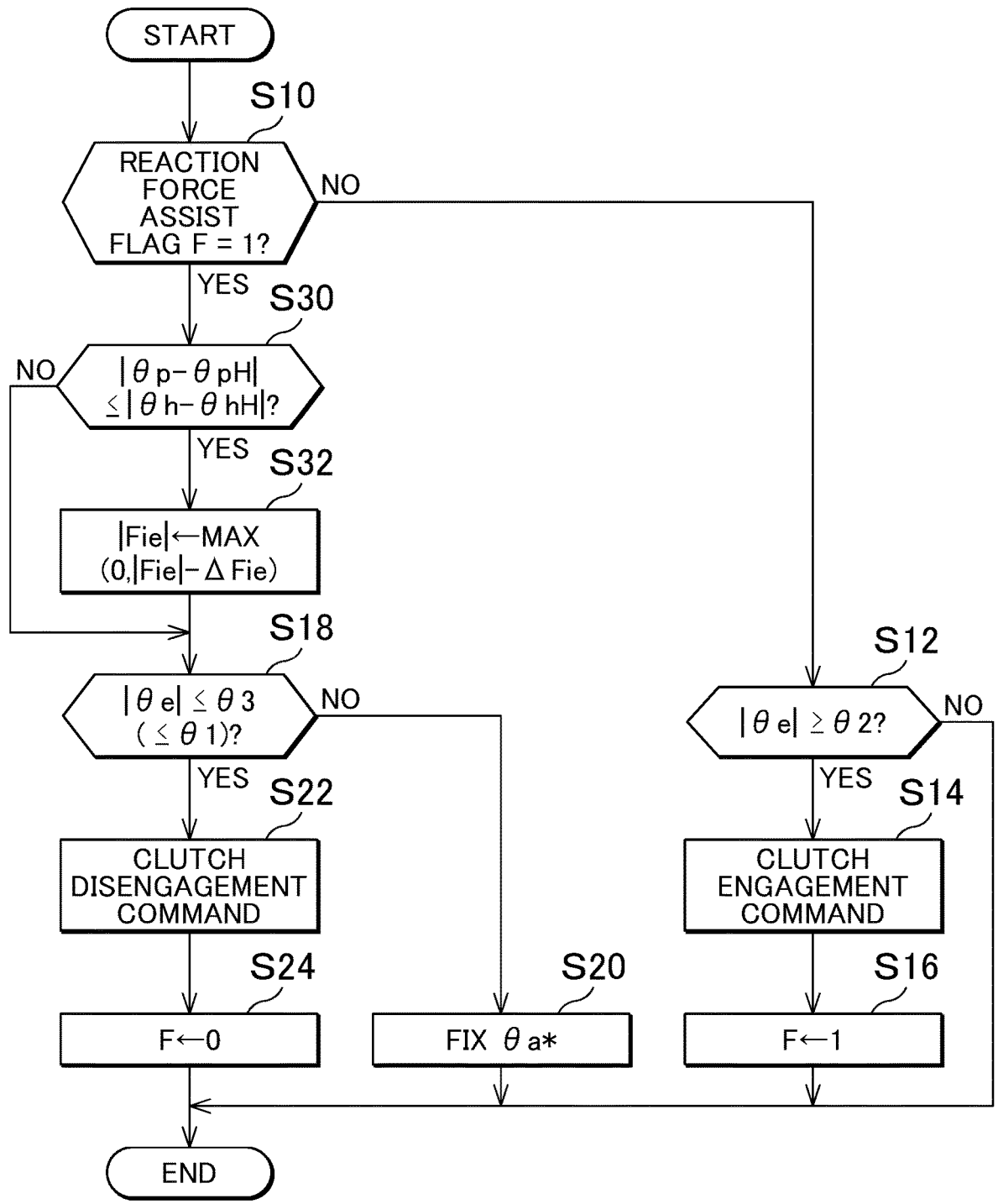
FIG. 6 is a flowchart illustrating the procedures of a process of engaging and disengaging a clutch according to a third embodiment.

In the present embodiment, therefore, the process illustrated in FIG. 6 is executed instead of the process illustrated in FIG. 4. FIG. 6 illustrates the procedures of a process of engaging and disengaging the clutch 12 according to the present embodiment. The process illustrated in FIG. 6 is achieved when the CPU 82 executes a program stored in the memory 84 repeatedly at prescribed time intervals. The process illustrated in FIG. 6 substitutes for the process illustrated in FIG. 4. For the sake of convenience, the same steps as those in FIG. 4 will be denoted by the same step numbers and the detailed description thereof will be omitted.

In the procedures of process illustrated in FIG. 6, when the CPU 82 determines that the reaction force assist flag F is 1 (S10: YES), then the CPU 82 then determines whether the absolute value of the difference between the steered angle θp and the upper limit value θpH is equal to or smaller than the absolute value of the difference between the steering angle θh and the upper limit value θhH (S30). This process is a process of determining whether to execute a process of progressively reducing the limiting reaction force Fie. When the CPU 82 determines that the absolute value of the difference between the steered angle θp and the upper limit value θpH is equal to or smaller than the absolute value of the difference between the steering angle θh and the upper limit value θhH (S30: YES), the CPU 82 then reduces the absolute value of the limiting reaction force Fie by a prescribed amount ΔFie (S32). The minimum value of the absolute value of the limiting reaction force Fie is set to zero. Therefore, when the absolute value of the limiting reaction force Fie is smaller than the prescribed amount ΔFie, the CPU 82 sets the limiting reaction force Fie to zero in the process in S32. When the process in S32 is completed or when a negative determination is made in S30, the CPU 82 proceeds to S18.

The operation of the present embodiment will be described below. When the maximum value θe has become equal to or larger than the limitation start threshold value θ1, the CPU 82 controls the torque generated by the reaction-force motor 26 so as to achieve the reaction force command value Trqr* that is set based on the limiting reaction force Fie. Then, the CPU 82 engages the clutch 12 when the maximum value θe has become equal to or larger than the engagement threshold value θ2. Then, the CPU 82 progressively reduces the limiting reaction force Fie to zero, on the condition that the CPU 82 determines that the absolute value of the difference between the steered angle θp and the upper limit value θpH is equal to or smaller than the absolute value of the difference between the steering angle θh and the upper limit value θhH. Thus, the amounts of heat generated by the reaction-force motor 26 and the inverter 28 can be reduced. Moreover, in this case, before the spiral cable 68 is fully stretched, the rack shaft 46 comes into contact with the rack housing 44, which makes it impossible to turn the steering wheel 10. Thus, it is possible to reduce the occurrence of a situation where the steering angle θh becomes so large as to reduce the reliability of the spiral cable 68, while reducing power consumption of the reaction-force actuator 20.

The correspondence relationship between the matters described in the foregoing embodiments and the matters described in claims is as follows.

The clutch 12 is an example of a switching device. The process executed by the limiting reaction force setting processing circuit M10b, the addition processing circuit M10c, the deviation calculation processing circuit M12, the steering angle command value calculation processing circuit M20, the steering angle feedback processing circuit M22, the addition processing circuit M24, and the operation signal generation processing circuit M26 is an example of a limitation process. The process in S14 is an example of a transmission process, and the controller 80 is an example of a steering controller. The steering angle θh at which the maximum value θe reaches the limitation start threshold value θ1 is an example of a first threshold value, and the steering angle θh at which the maximum value θe reaches the engagement threshold value θ2 is an example of a second threshold value. A value obtained by converting a part of the reaction force command value Trqr*, which contributes to the limiting reaction force Fie, based on a reduction ratio of the reaction-force-side speed reducer 24 is an example of an absolute value of a limiting reaction force applied to the steering wheel.

The process executed by the steering angle ratio variable setting processing circuit M28 is an example of a steering angle ratio variable setting process. The process executed by the integration processing circuit M2 and the process executed by the measurement unit setting processing circuit M4 are examples of a steering angle acquisition process and a steered angle acquisition process.

The spiral cable device 60 is an example of a steering-side device, and the battery 72 is an example of an external device. The process in S30, S32 is an example of a progressive reduction process.

At least one of the matters of the foregoing embodiments may be modified as follows.

In the foregoing embodiments, when the clutch 12 is engaged, the process illustrated in FIG. 2 is basically continued while the target operation angle θa* is fixed. However, the operation of the steering system 1 when the clutch is engaged is not limited to this example. For example, while the reaction force command value Trqr* is set to zero, the steered operation torque command value Trqt* may be set to a value that is obtained by subtracting the limiting reaction force Fie, which is determined based on the steered angle θp through the same process as the process executed by the limiting reaction force setting processing circuit M10b, from a torque determined based on the steering torque Trqs through the same process as the process executed by the assist torque setting processing circuit M6.

For example, when the reaction force command value Trqr* is set to zero, a manipulated variable for the feedback-control of the steered angle θp may be used as the steered operation torque command value Trqt*, instead of the steered operation torque command value Trqt* calculated based on the steering torque Trqs through open-loop control. Specifically, in the same process as the process of setting the steering angle command value θh* in FIG. 2, the steered angle command value θp* as an input into the reaction force setting processing circuit M10 may be replaced with the steered angle θp, the steering angle command value θh* as a final output value may be replaced with the steered angle command value θp*, and the steered operation torque command value Trqt* may be set such that the steered angle θp follows the steered angle command value Op* through feedback control. Moreover, for example, the sum of a manipulated variable for the feedback control and a manipulated variable for the open-loop control may be used as the steered operation torque command value Trqt*.

For example, while the steered operation torque command value Trqt* is set to zero, the reaction force command value Trqr* may be set to a value obtained by subtracting the limiting reaction force Fie from the assist torque Trqa*. In this case, the relationship between the steering torque Trqs and the assist torque Trqa* determined by the assist torque setting processing circuit M6 may be changed from that before the clutch 12 is engaged.

For example, a torque value that is obtained by subtracting the limiting reaction force Fie from a torque determined based on the steering torque Trqs by the same process as the process executed by the assist torque setting processing circuit M6 may be divided into the reaction force command value Trqr* and the steered operation torque command value Trqt*. Note that, "dividing A into the reaction force command value Trqr* and the steered operation torque command value Trqt*" does not mean that the equation Trqr*+Trqt*=A holds true, but means the following. For example, if A is an amount having the magnitude of a torque of the rotary shaft 26a, the sum of the reaction force command value Trqr* and a value that is equivalent to the torque of the rotary shaft 26a and that is obtained by converting the steered operation torque command value Trqt* based on the rotation speed ratio between the rotary shaft 56a and the rotary shaft 26a is A.

In the third embodiment, the limiting reaction force Fie is progressively reduced to zero, but the progressive reduction process is not limited to this example. For example, this process may be a process of progressively reducing the limiting reaction force Fie to a prescribed value that is larger than zero.

As will be described in the paragraphs about the limitation start threshold value, the process in S30 may be omitted from the process in FIG. 6, in the case where the spiral cable 68 is not fully stretched as long as the steered angle is controlled so as to be equal to or smaller than the steered angle threshold value at any steering angle ratio that is set by the steering angle ratio variable setting processing circuit M28.

As for the setting of the steered angle command value and the steering angle command value, instead of the process illustrated in FIG. 2, for example, a steered angle command value calculation processing circuit may be provided. The steered angle command value calculation processing circuit calculates the steered angle command value θp* based on a value output from the deviation calculation processing circuit M12 through the same process as the process executed by the steering angle command value calculation processing circuit M20. In this case, a value obtained by subtracting the target operation angle θa* from the steered angle command value θp* may be used as the steering angle command value θh*.

The steering angle command value calculation processing circuit M20 may set the steering angle command value θh* according to a model equation expressed by Equation (c2), instead of the model equation expressed by Equation (c1).

$$\Delta = K \cdot \theta h^* + C \cdot \theta h^{*\prime} + J \cdot \theta h^{*\prime\prime}\qquad\text{Equation (c2)}$$

Here, a spring constant K is obtained by modeling an influence of the vehicle, and is determined based on the specifications of the suspension, wheel alignment, and so forth. In the foregoing modified example in which the steered angle command value θp* is set based on the model without using the steering angle command value θh*, the steering angle command value θh* in Equations (c1), (c2) are replaced with the steered angle command value θp*.

The steering angle acquisition process and the steered angle acquisition process are not limited to the processes of acquiring the steered angle θp and the steering angle θh. For example, the steered angle command value θp* may be acquired instead of the steered angle θp. Alternatively, for example, the steering angle command value θh* may be acquired instead of the steering angle θh. Further alternatively, for example, both the steered angle command value θp* and the steering angle command value θh* may be acquired instead of the steered angle θp and the steering angle θh, respectively. However, for example, in a case where a value obtained by adding the target operation angle θa* to the steering angle command value θh* is used as the steered angle command value Op*, it is desirable that, when the reaction force assist flag F is from zero to 1, a value obtained by subtracting the steering angle command value θh* at the timing of the switching from the steered angle command value θp* at the same timing be assigned to the target operation angle θa*. However, the process in S20 may be executed instead of this process.

The limitation start threshold value may be set as follows.

(a) In the foregoing embodiments, a pair of parameters that are the steering angle and the steered angle is used as a comparison object to be compared with the limitation start threshold value θ1. However, the comparison object is not limited to this example. For example, in a four-wheel-drive vehicle, the comparison object may be three parameters that are a steered angle of the front wheels, a steered angle of the rear wheels, and a steering angle. In this case, the maximum value θe out of these three parameters may be selected instead of the process executed by the maximum value selection processing circuit M36.

Alternatively, the comparison object may be a single parameter. Specifically, for example, the steered angle may be used as the single parameter, in a case where the spiral cable 68 has a margin and is not fully stretched as long as the steered angle is controlled so as to be equal to or smaller than the steered angle threshold value at any steering angle ratio that is set by the steering angle ratio variable setting processing circuit M28. Alternatively, for example, the steering angle may be used as the single parameter, in a case where the spiral cable 68 has no margin and the rack shaft 46 does not come into contact with the rack housing 44 as long as the steering angle is controlled so as to be equal to or smaller than the steering angle threshold value at any steering angle ratio that is set by the steering angle ratio variable setting processing circuit M28. However, in order to more reliably prevent a decrease in the reliability of the spiral cable 68, it is desirable to adopt such settings that the spiral cable 68 is not fully stretched as long as the steered angle is controlled so as to be equal to or smaller than the steered angle threshold value at any steering angle ratio that is set by the steering angle ratio variable setting processing circuit M28.

Moreover, the steered angle may be used as the single parameter, if the spiral cable 68 is not provided, as will be described in the paragraph about the spiral cable device.

(b) The setting of the limitation start threshold value is not limited to the setting in which the steering angle threshold value and the steered angle threshold value are each used as a common threshold value. For example, instead of the limiting reaction force setting processing circuit M10b, a processing circuit configured to set a first limiting reaction force to a large value when the steering angle θh or the steering angle command value θh* has approached the steering angle threshold value, and another processing circuit configured to set a second limiting reaction force to a large value when the steered angle θp or the steered angle command value θp* has approached the steered angle threshold value may be provided. In this case, the sum of the first limiting reaction force and the second limiting reaction force, or the larger one of the first limiting reaction force and the second limiting reaction force may be used as the limiting reaction force Fie. In this case as well, the first threshold value is a smaller one of the steering angle threshold value and the steering angle corresponding to the steered angle threshold value at the present steering angle ratio.

The steering angle feedback processing circuit is not limited to the circuit configured to calculate the feedback torque Trqr1* as the sum of the output values from the proportional element, the integrating element, and the differentiating element based on an input of the value that is obtained by subtracting the steering angle θh from the steering angle command value θh*. For example, the steering angle feedback processing circuit may be a circuit configured to calculate the feedback torque Trqr1* as the sum of the output values from the proportional element and the differentiating element based on the input of the value that is obtained by subtracting the steering angle θh from the steering angle command value θh*.

In the foregoing embodiments, the sum of the feedback torque Trqr1* and the assist torque Trqa* is used as the command value for the reaction-force motor 26, but the command value for the reaction-force motor is not limited to this example. For example, the feedback torque Trqr1* may be used as a command value for the reaction-force motor 26.

The steered angle feedback processing circuit is not limited to the circuit configured to calculate the feedback manipulated variable (steered operation torque command value Trqt*) as the sum of the output values from the proportional element, the integrating element, and the differentiating element based on the input of the value that is obtained by subtracting the steered angle θp from the steered angle command value θp*. For example, the steered angle feedback processing circuit may be a circuit configured to calculate the feedback manipulated variable as the sum of the output values from the proportional element and the differentiating element based on the input of the value that is obtained by subtracting the steered angle θp from the steered angle command value θp*.

In the steered operation actuator, the steered-side motor 56 is not limited to an SPMSM, and an IPMSM may be used instead of an SPMSM. The steered-side motor 56 is not limited to a synchronous motor, and may instead be an induction motor, for example. The steered operation actuator is not limited to a dual pinion-type actuator. For example, a Rack-cross (R) type actuator, a Rack-parallel (R) type actuator, or a rack coaxial type actuator may be used.

The steering controller is not limited to the controller that includes the CPU 82 and the memory 84 and executes software processes. For example, the steering controller may include a dedicated hardware circuit (e.g., ASIC) that executes at least some of the processes that are executed by software in the foregoing embodiments. Specifically, the steering controller may have any one of the following configurations (a) to (c): (a) a configuration including a processing device that executes all the processes according to programs, and a memory storing these programs; (b) a configuration including a processing device that executes some of the processes according to the programs, a memory storing these program, and a dedicated hardware circuit that executes the remaining processes; and (c) a configuration including a dedicated hardware circuit that executes all the processes.

The spiral cable device may be a device that receives electric power that is contactlessly supplied thereto from, for example, the battery 72 serving as a power source. In this case, the spiral cable 68 is not required, and there is no upper limit value of the steering angle θh attributable to the spiral cable 68.

In FIG. 2, the input into the base reaction force setting processing circuit M10a may be the steered angle θp instead of the steered angle command value θp*.

The reaction-force motor 26 is not limited to an SPMSM, and may instead be an IPMSM. The reaction-force motor 26 is not limited to a synchronous motor, and may instead be an induction motor, for example. In FIG. 2, it is not absolutely necessary that the steering angle ratio variable setting processing circuit M28 is provided.

What is claimed is:

1. A steering controller configured to control a steering system including (i) a switching device configured to perform switching between a transmission state where mechanical power transmission from a steering wheel to steered wheels is allowed and an interruption state where mechanical power transmission from the steering wheel to the steered wheels is interrupted, (ii) a reaction-force actuator configured to apply a steering reaction force to the steering wheel in the interruption state, and (iii) a steered operation actuator configured to steer the steered wheels, the steering controller comprising:

a memory configured to store control software; and
a hardware device configured to execute the control software, wherein
when an absolute value of a steering angle achieved by an operation of the steering wheel has reached a first threshold value in the interruption state, the steering controller executes a limitation process of operating the reaction-force actuator so as to apply, to the steering wheel, a limiting reaction force that is a reaction force for suppressing the absolute value of the steering angle from further increasing,
when the absolute value of the steering angle has become equal to or larger than a second threshold value that is larger than the first threshold value, the steering controller executes a transmission process of operating the switching device so as to execute switching from the interruption state to the transmission state, and
the steering controller is configured to:
execute a steering angle acquisition process of acquiring the steering angle achieved by the operation of the steering wheel;
execute a steered angle acquisition process of acquiring a steered angle of the steered wheels;
determine a steering angle command value based on the steering angle;
determine a target operation angle that sets a steering angle ratio, which is a ratio between the steering angle and the steered angle;
determine a steered angle command value by adding the steering angle command value to the target operation angle; and
execute, when in the interruption state, control to cause the steered angle of the steered wheels to follow the steered angle command value.

2. The steering controller according to claim 1, wherein
the steering controller executes a steering angle ratio variable setting process of variably setting the steering angle ratio,
the limitation process is a process of operating the reaction-force actuator so as to apply, to the steering wheel, the limiting reaction force that is a reaction force for suppressing the steering angle from further increasing, when either of following propositions i) or ii) is true: i) the absolute value of the steering angle acquired through the steering angle acquisition process is equal to or larger than a steering angle threshold value that is a threshold value of the steering angle; and ii) an absolute value of the steered angle acquired through the steered angle acquisition process is equal to or larger than a steered angle threshold value that is a threshold value of the steered angle, and
the first threshold value is a smaller one of the steering angle at which the steered angle reaches the steered angle threshold value at a present steering angle ratio, and the steering angle threshold value.

3. The steering controller according to claim 2, wherein
the steering wheel is provided with a steering-side device configured to turn together with the steering wheel in an integrated manner, and
the steering-side device is connected via a cable to an external device configured to turn relative to the steering wheel.

4. The steering controller according to claim 3, wherein, in the transmission state achieved through the transmission process, the steering controller executes a progressive reduction process of progressively reducing an absolute value of the reaction force that is applied from the reaction-force actuator to the steering wheel through the limitation process, on a condition that an amount of change in the steering angle that is required to adjust an absolute value of a difference between the steered angle and the steered angle threshold value to zero is equal to or smaller than an absolute value of a difference between the steering angle and the steering angle threshold value.

5. The steering controller according to claim 1, wherein, in the transmission state achieved through the transmission process, the steering controller executes the interruption process of operating the switching device so as to perform switching from the transmission state to the interruption state, when the absolute value of the steering angle has become equal to or smaller than a third threshold value that is equal to or smaller than the first threshold value.

6. The steering controller according to claim 1, wherein the switching device is a clutch, the clutch is engaged in the transmission state, and the clutch is disengaged in the interruption state.

7. The steering controller according to claim 1, wherein in the transmission state achieved through the transmission process, the steering controller executes an interruption process of operating the switching device so as to perform switching from the transmission state to the interruption state when an absolute value of a steering torque applied by a driver to the steering wheel is less than or equal to a threshold torque value.

\* \* \* \* \*